United States Patent [19]

Simic

[11] 4,129,453

[45] Dec. 12, 1978

[54] SULFUR COMPOSITION

[75] Inventor: Milutin Simic, Novato, Calif.

[73] Assignee: Chevron Research Company, San Francisco, Calif.

[21] Appl. No.: 518,438

[22] Filed: Oct. 29, 1974

[51] Int. Cl.$^2$ .............................................. C09K 3/00
[52] U.S. Cl. .................................. 106/287.32; 106/2
[58] Field of Search .......................... 106/286, 287 SC

[56] References Cited

U.S. PATENT DOCUMENTS

| | | | |
|---|---|---|---|
| 3,383,230 | 5/1968 | Streib et al. ........................... | 106/286 |
| 3,465,064 | 9/1969 | Signouret ........................ | 106/287 SC |
| 3,676,166 | 7/1972 | Louthan .......................... | 106/287 SC |
| 3,823,019 | 7/1974 | Dale et al. ....................... | 106/287SC |

*Primary Examiner*—Theodore Morris
*Attorney, Agent, or Firm*—D. A. Newell; John Stoner, Jr.; A. T. Bertolli

[57] ABSTRACT

A composition comprising sulfur, a plasticizer, asbestos fibers, and a dispersing agent and wherein the asbestos fibers include 20 to 80 weight percent amphibole and 20 to 80 weight percent chrysotile. The composition is useful as a construction material and as a coating, for example in water-tight and/or acid-resistant surfaces.

1 Claim, No Drawings

SULFUR COMPOSITION

BACKGROUND OF THE INVENTION

The present invention relates to a composition which can be used as a coating and which contains a major amount of sulfur which has been plasticized and reinforced.

Compositions containing sulfur have been investigated for use as coatings, as sulfur-aggregate concretes, and as sulfur-asphalt road paving mixtures. It has been proposed to use sulfur-polysulfide-glass fiber reinforced compositions for joining blocks for wall construction as in U.S. Pat. No. 3,306,000. It has also been proposed to use sulfur coatings for forming impervious layers in walls and generally for coating earthen tanks, drainage and irrigation canals, ponds, concrete structures, etc. The composition of the present invention is advantageously used in these services and also as an impregnation medium in forming various structures.

The use of glass fibers and also, alternatively, the use of asbestos in sulfur coating compositions has been disclosed in "Sulfur Coatings for Mine Support" by Dale and Ludwig in a report for the U.S. Bureau of Mines, November 1972. In this report it is pointed out that glass fibers appeared better than the asbestos, page 5 of the report. As pointed out in Kirk-Othmer Encyclopedia of Chemical Technology, Second Edition, Volume 12, at page 189, glass fiber is one of the strongest reinforcements available for reinforcing plastics.

Also as pointed out in Kirk-Othmer at page 189, other fibers used in quantity for reinforcing plastics are cotton and asbestos.

U.S. Patent application Ser. No. 286,627 has been offered for license by the Bureau of Mines. Ser. No. 286,627 is directed to a coating composition containing sulfur, dicyclopentadiene, glass fiber, and talc.

SUMMARY OF THE INVENTION

According to the present invention a composition is provided comprising sulfur, a plasticizer, asbestos fibers, and a dispersing agent and wherein the asbestos fibers include 20 to 80 weight percent amphibole and 20 to 80 weight percent chrysotile.

Among other factors, the present invention is based on my finding that the use of the specified asbestos fibers rather than glass fiber results in a surprisingly strong composition. Also the use of the asbestos fibers lowers the cost of the composition. In some instances I have found that mineral deposits can be obtained which have both the asbestos and dispersing agent (e.g. talc and/or mica) as a physical mixture in the mined deposit. Hence the mined deposit results in a low-cost substance to be added to the sulfur plus plasticizer to obtain the desired composition and at the same time is a substance effecting very advantageous strength properties for the sulfur composition.

Preferably the composition of the present invention is prepared by heating sulfur to a molten temperature and then mixing in the plasticizer and asbestos and dispersing agent. When used, the composition is allowed to cool to form a solid coating or to rigidify a structure, etc.

The present composition includes a plasticizer to plasticize the sulfur. Plasticizers are well known in the sulfur art (see Alberta Sulfur Research, Ltd., Quarterly Bulletin, Vol. VIII, No. 4, January-March 1972) and frequently include compounds having one or more sulfur atoms in the molecule.

Plasticized sulfur usually has a lower melting point and a higher viscosity than elemental sulfur. Furthermore, plasticized sulfur requires a longer time to crystallize; i.e., the rate of crystallization of plasticized sulfur is slower than that of elemental sulfur. One useful way to measure the rate of crystallization is as follows: The test material (0.040 g) is melted on a microscope slide at 130° C. and is then covered with a square microscope slide cover slip. The slide is transferred to a hotplate and is kept at a temperature of 78°±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to or reacted with molten elemental sulfur, cause an increase in crystallization time in reference to the elemental sulfur itself. In one set of experiments, elemental sulfur required 0.44 minute to crystallize under the above conditions, whereas sulfur containing 3.8% of a phenol-sulfur adduct (as described in Ser. No. 344,694) required 2.9 minutes. Sulfur containing 6.6% and 9.9% of the same phenol-sulfur adduct required 5.7 and 22 minutes, respectively.

Inorganic plasticizers include iron, arsenic and phosphorus sulfides, but the particularly preferred plasticizers are organic compounds which can react with sulfur to give sulfur-containing materials, such as styrene, alpha-methylstyrene, dicyclopentadiene, vinyl cyclohexene, the aromatic compound-sulfur adducts of Ser. No. 344,694, as well as the aromatic compounds used to produce these adducts, liquid polysulfides (e.g., those sold under the trade name of Thiokol LP-3 or LP-32), and the viscosity control agents described in U.S. Pat. Nos. 3,674,525, 3,453,125 and 3,676,166. The preferred aromatic plasticizing compounds are styrene and the phenol-sulfur adduct of commonly assigned Ser. No. 344,694, filed Mar. 26, 1973. The preferred aliphatic compounds are dicyclopentadiene and linear polysulfides. When phenol is used as the plasticizer, in order to obtain plasticization it is necessary to get the phenol to react with the sulfur; this reaction can advantageously be effected using base catalysis, e.g., using sodium hydroxide.

The term "dispersing agent" is used herein to mean a material which helps disperse the asbestos fibers and thus helps to avoid lumpiness when the composition of the present invention is being prepared in the molten or liquid state.

Talc and/or mica are preferred dispersing agents for use in the present invention. However, other mineral fillers as, for example, are used in the paint industry, are satisfactory. For instance, calcium carbonate, calcium sulfate, and silicates can be used.

The term "talc" is used herein to mean a layered silicate having an x-ray diffraction pattern d spacing less than 9.6 A. Typical talcs are commonly referred to as soapstone and steatite.

The term "mica" is used herein to mean a layered silicate having an x-ray diffraction pattern d spacing about 9.6 to 10.1 A., preferably a d spacing of about 9.9 to 10.1 A. Talc material also is a layered silicate, but has a d spacing of about 9.35 A.

Preferably the composition of the present invention comprises about 50 to 95 weight percent sulfur, 0.5 to 15 weight percent plasticizer, 0.2 to 10 weight percent of the asbestos fibers, and 1 to 49 weight percent of the talc or mica.

Particularly preferred amounts of the above substances in the composition are 85 to 90 weight percent sulfur, 1 to 3 weight percent plasticizer, 1 to 5 weight percent of the asbestos fibers, and 5 to 10 weight percent of the talc or mica.

The most preferred plasticizer for use in the composition of the present invention is dicyclopentadiene.

The term "asbestos" is used herein to include fibrous mineral silicates which can be divided into two large groups, one called chrysotile (also referred to as serpentine) and the other called amphibole. Amphibole contains as subdivisions the minerals anthophyllite, amosite (ferroanthophyllite), crocidolite, tremolite, and actinolite.

Preferably the asbestos fibers used in the composition of the present invention are 40 to 60 weight percent amphibole and 40 to 60 weight percent chrysotile. Particularly preferred compositions include those wherein the amphibole is predominantly tremolite. Thus preferably the tremolite is at least 50 percent of the amphibole-type asbestos, and more preferably at least about 80 or 90 percent of the amphibole-type asbestos.

FURTHER DESCRIPTION AND EXAMPLES

The compositions of this invention are prepared by adding a plasticizer to molten sulfur, followed by the dispersing agent and finally the asbestos fibers. For this purpose, sulfur is heated to a temperature above the melting point (i.e., above about 116° C.) but preferably in the range of about 140° to 160° C. Then the plasticizer is added and mixed intimately with the molten sulfur. When a plasticizer is formed by "in situ" reaction of a plasticizer compound, sufficient time, from about 5 to 50 minutes, is allowed for reaction before the remainder of the components are added. It is then preferable to add the dispersing agent before any other ingredients because this helps in obtaining good dispersion in the plasticized sulfur. After all the ingredients have been added the composition is stirred to obtain a homogeneous blend, about 10 to 100 minutes.

The final composition, in the molten state, is then charged to a mold or is discharged through a hose and nozzle onto a surface for a coating application. In some instances it may be desirable to cast the material into blocks for storage and future use after remelting.

EXAMPLES

Dicyclopentadiene was added to molten sulfur at a temperature of about 150° C. The resulting mixture was stirred for about 10 minutes. Then talc (Mistron Vapor talc) and 0.25 inch milled glass fiber were added. The resulting composition was stirred for about one hour.

The above composition was poured into a mold to make castings, which castings, in turn, were used as test specimens 1G and 2G in Table I below. The compositions of the specimens were as given in the table.

Similarly, using the type preparation procedure as above described, test specimens were prepared in accordance with the present invention. These specimens contained asbestos instead of glass fiber. The particular asbestos-talc filler used in making test specimens 1A and 2A was obtained as one mineral deposit from a mine and is commonly identified as International Fiber - 1, (IF-1). The asbestos portion of this talc-asbestos deposit contained about 40 to 60 weight percent chrysotile and about 40 to 60 weight percent amphibole. The amphibole portion, in turn, was primarily tremolite. The nature of the asbestos composition was determined by x-ray diffraction analysis.

As can be seen from the table, the strength properties of the material containing the asbestos in accordance with the present invention were, in general, better or at least about as good as that for the material containing glass fiber instead of the asbestos in accordance with the present invention. The parenthetical numbers listed under the respective first numbers given in the columns for the properties indicate the range of test properties found for the particular specimen with the upper number (not in parentheses) being an approximate representative number obtained on an averaging basis. As can be seen from the table, the tensile, compressive and shear strength for the composition containing the asbestos in accordance with the present invention were higher than those numbers for the composition containing the glass fiber. The cost of the asbestos as used to generate exemplary information was considerably less than the cost of the glass fiber.

TABLE I

| | Composition, Wt. % | | | | Properties | | | | |
|---|---|---|---|---|---|---|---|---|---|
| No. | Sulfur | DCP | Filler | Talc | Glass or Asbestos | Flexural Strength, psi* | Flexural Modulus, 10³ psi* | Tensile Strength, psi** | Compressive Strength, psi*** | Shear Strength, psi**** |
| 1A | 88.0 | 2.0 | IF-1 | 8.0 | 2.0 | 1400 (1200–1640) | 8.0 | 930 (870–1040) | 7600 (7200–8000) | 1000 (950–1270) |
| 2A | 86.0 | 2.0 | IF-1 | 9.6 | 2.4 | 1270 (1100–1380) | 8.0 | 760 (680–840) | 6700 | 13 |
| 1G | 88.0 | 2.0 | Mistron Vapor talc | 7.0 | 3.0 | 1500 (1260–2100) | 6.0 | 700 (160–750) | 4800 | 900 (670–1200) |
| 2G | 88.0 | 2.0 | Mistron Vapor talc | 8.0 | 2.0 | 930 (720–1100) | 6.0 | 550 (510–590) | 5000 | 840 (520–1270) |

*ASTM D790-71
**ASTM D-638-71A using specimens prepared as per ASTM D1320-60T
***ASTM D695-69
****ASTM D732-46

I claim:

1. A composition comprising the following ingredients in about the indicated percentages by weight:

| | |
|---|---|
| Sulfur | 86–88% |
| Dicyclopentadiene plasticizer | 2% |
| Asbestos fibers | 2–4% |
| Talc dispersing agent | 8–9.6% | said asbestos fibers including, by weight, about 40–60% chrysotile and about 40–60% amphibole, the amphibole being predominantly tremolite.

* * * * *

UNITED STATES PATENT AND TRADEMARK OFFICE
CERTIFICATE OF CORRECTION

PATENT NO. : 4,129,453
DATED : December 12, 1978
INVENTOR(S) : Milutin Simic

It is certified that error appears in the above-identified patent and that said Letters Patent are hereby corrected as shown below:

Column 4, last column of Table I, opposite "No. 2A", "13" should read -- - --.

Signed and Sealed this

Nineteenth Day of June 1979

[SEAL]

Attest:

RUTH C. MASON
Attesting Officer

DONALD W. BANNER
Commissioner of Patents and Trademarks